Nov. 25, 1969 J. F. DAY 3,480,917

ARRANGEMENT FOR TRANSFERRING BETWEEN PROGRAM SEQUENCES IN A DATA PROCESSOR

Filed June 1, 1967 2 Sheets-Sheet 1

INVENTOR
J. F. DAY
BY [signature]
ATTORNEY 3,480,917

ARRANGEMENT FOR TRANSFERRING BETWEEN PROGRAM SEQUENCES IN A DATA PROCESSOR

James F. Day, Clark, N.J., assignor to Bell Telephone Laboratories, Incorporated, Murray Hill and Berkeley Heights, N.J., a corporation of New York Filed June 1, 1967, Ser. No. 642,867
Int. Cl. G11b *13/00;* G06f *1/00, 7/00*
U.S. Cl. 340—172.5 5 Claims

ABSTRACT OF THE DISCLOSURE

The disclosed program controlled data processor includes a random access bulk memory for storing a main program, subroutines and data and a computer or processing section. The computer section comprises address, instruction, data and jump registers, memory access circuits, an instruction decoder, timing and control logic, and a prewired transfer instruction code generator. The generator inserts a fixed transfer instruction code into the jump register at the same time a return address obtained from the address register is placed in the jump register during execution of a jump transfer to a subroutine. The first instruction of the subroutine then causes the jump register contents to be written into memory as the last instruction of the subroutine.

BACKGROUND OF THE INVENTION

The advantages of utilizing subroutines to optimize computer operations with respect to program storage space requirements are well-known in the computer art. Subroutines are particularly useful when a computer program includes a fixed sequence of instructions which is performed frequently but not in a uniformly recurring manner. Preparation of the recurring sequence of instructions as a subroutine permits arrangement of the main program so that the computer will transfer or jump from the main program to the subroutine, execute the sequence of operation defined by the subroutine and then return to the main program. A basic discussion of subroutine techniques is presented in "Arithmetic Operations in Digital Computers" by R. K. Richards, published by D. Van Nostrand Company, Inc., 1965, at page 363 et seq.

Return from a subroutine to the main program requires that the address of the main program instruction to which a return transfer is to be made must be defined and incorporated in a return transfer linking type instruction as a part of the subroutine sequence. Generally, the return address is the next sequential address in the main program following the address of the instruction which initiated the transfer from the main program to the subroutine. Therefore, the return address usually is defined by information in a program address (A) register within the computer which is incremented automatically each time an instruction is executed by the computer in preparation for fetching the next instruction from the main program to be executed. The return address often is transmitted automatically from the A register to a return address or jump (J) register whenever a jump transfer to a subroutine is performed as either an integral or an optional part of jump transfer instruction execution. In this case, the last instruction of the subroutine sequence is a transfer instruction calling for a return transfer to the instruction whose address is defined by the content of the jump (J) register. However, the J register may be needed for a use other than storing the return address during performance of the subroutine to which a transfer is made. In this situation, the return address has in the past been transmitted from the J register to a predetermined location in memory. It then must be retrieved from memory as a part of the subroutine in order to accomplish a return transfer to the main program. This retrie.'al requires the incorporation of additional memory accessing instructions into the subroutine and, as a result, requires an additional amount of time to accomplish the return transfer function.

Instruction words usually comprise an instruction portion and a data portion. The instruction portion contains coded information defining particular actions to be performed by the computer. The data portion may define an address in memory upon which some operation defined by the instruction code is to be performed or may define data which is to be processed in accordance with the instruction portion of the word. For example, the data portion of a transfer instruction word usually contains the address of the instruction to which a transfer is to be made.

Although a few types of computer systems have the ability to write information into only the data portion of an instruction word as a single memory cycle operation without disturbing the instruction portion of the word, many computer systems are not so equipped. In such systems, writing of information into only the data portion of a word requires fetching the word from memory, combining the existing instruction portion of the word with data by means of masking or other type of logic function and writing the entire word thus derived back into the memory location from which it was fetched. This series of operations with memory requires a number of machine cycles and a relatively large amount of computer time, even though the actions taken may be specified by a single program instruction. Therefore, this technique of inserting return address information into a transfer instruction word forming part of a subroutine for the purpose of defining a return transfer operation requires a substantial amount of computer time. Since a subroutine is, by definition, a frequently executed sequence of instructions, the amount of computer time expended is compounded by the number of times the subroutine is executed.

The problem to which my invention is directed is the rapid accomplishment of a return transfer operation including the derivation of a return address and its insertion as part of a transfer instruction at an appropriate location within a subroutine. This problem is particularly acute when the J register is needed to store information other than a return address during execution of a subroutine to which a transfer has been made. My invention is particularly advantageous in computer systems which are capable only of writing entire instruction words into memory as a single machine cycle operation.

BRIEF SUMMARY OF THE INVENTION

In accordance with my invention, hardware circuitry within a computer initiates the registration of a prewired instruction code defining a transfer instruction in a return address (J) register as an integral part of the execution of a jump transfer instruction during which a return transfer address also is placed in the J register. The first instruction of a subroutine to which a jump transfer is made initiates the writing of the content of the J register, including the return address and the transfer instruction code, into the program memory as the last instruction word in the sequence of instructions of which the subroutine is comprised. When this last instruction of the subroutine is reached, it initiates a return transfer to the next instruction of the main program to be executed whose memory location is defined by the return address. Advantageously, this is accomplished without resorting to any additional memory reading operations to obtain either the return address or the transfer instruction code from other memory locations and without requiring additional computer time for obtaining and logically combining a transfer instruction code with return address information to produce a complete instruction word.

In accordance with my invention, not only is there obtained a significant saving in time over prior techniques for generating or reading out of memory the required transfer instruction and address but there is an equally important saving in memory words required in the memory.

DETAILED DESCRIPTION

Computer organization and basic operation

Figure 1:
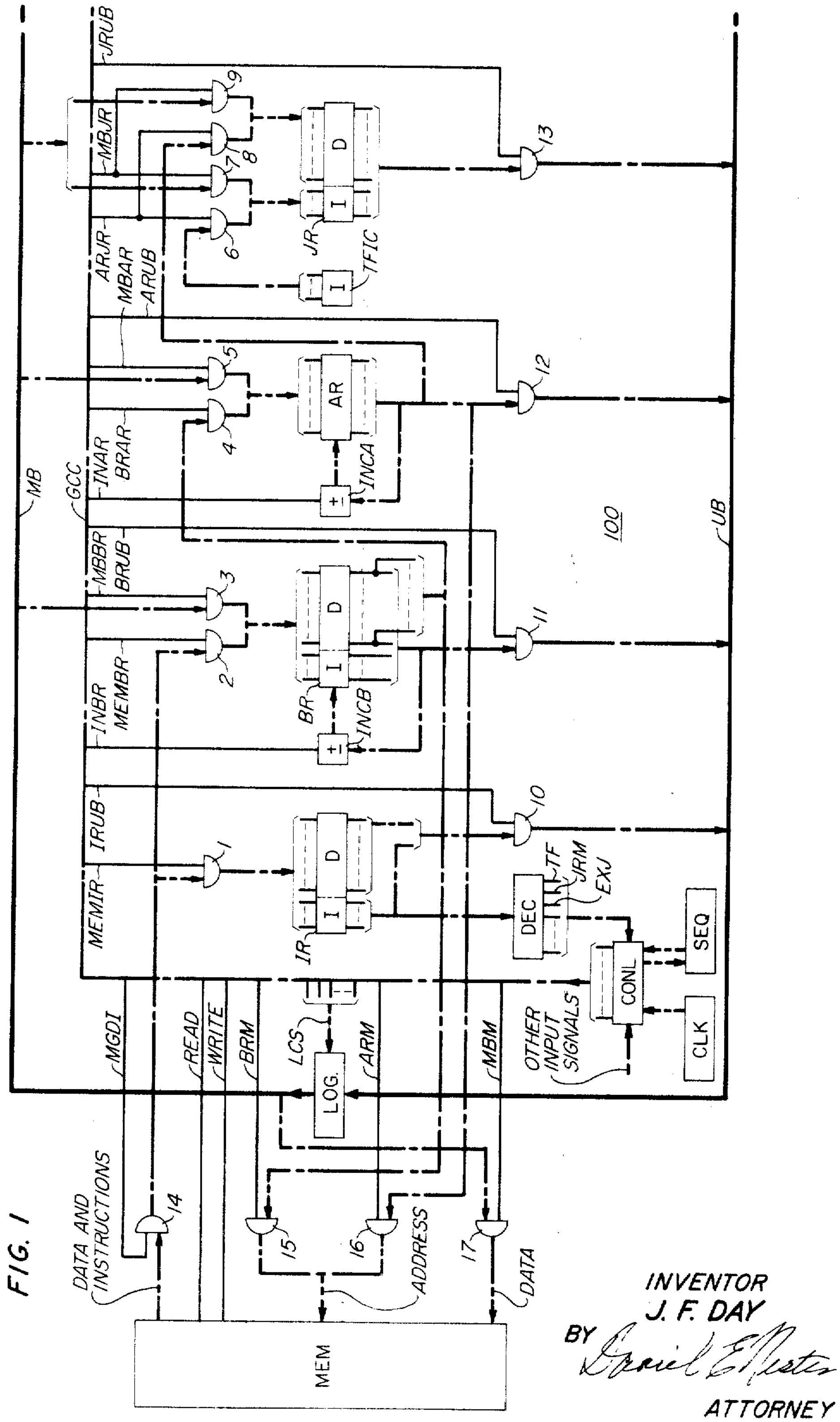
FIG. 1 is a block diagram which schematically illustrates the organization of a small portion of an illustrative computer system incorporating my invention.

The illustrative computer arrangement shown in the block diagram of FIG. 1 illustrates only those elements of a computer system whose functions are directly pertinent to an understanding of my invention.

The program of instruction words to be executed by the processing section, hereinafter referred to as computer 100, is stored in a random access bulk memory MEM. Data upon which computer 100 operates also is stored in memory MEM. Gating circuits 14, 15, and 16 represent the means by which memory addresses are transmitted from registers AR and BR of computer 100 to memory MEM and instruction and data words are transmitted from memory MEM to registers IR and BR of computer 100. Gates 17 represent the access arrangement for transmitting data to memory MEM. Decoder DEC decodes instruction words stored in instruction register IR and provides output signals which define the type of operations required of computer 100. Clock circuit CLK generates a timing pulse sequence for controlling the sequential gating operations within computer 100. Sequence circuit SEQ is advanced through a varying plurality of sequence states during execution of various instructions and provides output signals which define and control the sequential progress of computer 100 in completing a particular series of prescribed actions. Control logic CONL logically combines the input signals from sequence circuit SEQ, clock circuit CLK, decoder DEC and other sources within computer 100 to generate the gating control signals which specify the sequential actions to be taken by computer 100 in completing the performance of a particular operation.

The data processing facilities of computer 100 include a plurality of multistage flip-flop registers of which data register BR, address register AR and jump register JR are shown in FIG. 1. Data can be gated into any of these registers from a masked bus MB. Data can be gated out of any of these registers to an unmasked bus UB. Masked bus MB and unmasked bus UB are connected by a logic circuit LOG. Information can be moved from one register to another register via unmasked bus UB, logic circuit LOG and masked bus MB. This information can be passed unchanged through logic LOG from unmasked bus UB to masked bus MB or it can be modified by logical operations performed by logic circuit LOG in accordance with gating control signals generated in control logic CONL. The content of instruction register IR can be gated to unmasked bus UB; however, information cannot be placed into register IR from masked bus MB.

Each of the registers IR, BR, and JR includes an instruction portion I and a data portion D. Register AR includes only a data portion D. Registers IR and JR cannot be gated directly to memory MEM. The content of these registers must first be gated to unmasked bus UB and passed through logic LOG to masked bus MB. Data can then be gated from masked bus MB through AND gates 17 to memory MEM.

Address register AR serves as the normal source of address information defining memory locations in memory MEM from which instructions are to be obtained. Register AR is equipped to store only address information and has no facilities for storing instruction codes. Address register AR has an incrementing circuit INCA associated therewith which is selectively controlled by signals from control logic CONL to increment the content of register AR. The content of register AR can be gated through AND gates 8 into the data portion D of jump register JR. Generally, this action is taken whenever a jump transfer instruction requiring a return transfer from a subroutine is executed.

Register BR also can serve as a source of address information. Usually, address information taken from the data portion D of register BR defines memory locations from which pure data words rather than instruction words are to be fetched and memory locations into which a data word is to be written. Information in the data portion D of register BR can be gated through AND gates 4 directly to register AR.

Words stored in memory MEM are fetched by the computer 100 by means of memory read command. These commands are generated by computer 100 in the course of executing the instructions of the program stored in memory MEM. Address information defining the memory location in memory MEM of the word which is to be fetched usually is registered in register AR. The content of register AR is gated through AND gates 16 and transmitted to memory MEM in association with a READ signal. In response to the receipt of a memory read command, memory MEM reads the memory location identified by the address included in the command. An instruction word thus obtained is transmitted to computer 100 and is gated simultaneously into instruction register IR and data register BR. If, in the course of executing the instruction thus obtained, data words are read from memory MEM, the data words thus read are placed only into data register BR and not register IR.

Words are written into memory MEM by computer 100 by means of memory write commands. These commands are generated in the course of executing certain instructions of the program stored in memory MEM. Address information defining the memory location in memory MEM into which a word is to be written usually is registered in register BR. The content of the data portion D of register BR is gated through AND gates 15 and transmitted to memory MEM in association with a WRITE signal. The word to be written into memory is then gated from the appropriate register in computer 100 to the unmasked bus UB and from the unmasked bus UB through logic LOG to the masked bus MB. The information on masked bus MB is transmitted through AND gates 17 to memory MEM. Memory MEM then writes the data word received through AND gates 17 into the memory location defined by the address previously received through AND gates 15. Information thus written into memory MEM may comprise either an instruction word or a word containing only data. Memory MEM is capable only of writing entire words into memory locations and cannot write selected portions of words into memory locations without disturbing the other information stored in that memory location.

An instruction word stored in register IR is decoded by decoder DEC and DC signals are fed into control logic circuit CONL from decoder DEC which identify the instruction in register IR. In response to periodic timing pulses received from clock circuit CLK, the input signals received from decoder DEC and other input signals indicating the result of intermediate steps in the execution of the instruction, control logic CONL causes sequence circuit SEQ to acquire successive circuit states. The state of sequence circuit SEQ in conjunction with periodic pulses from clock circuit CLK and the input signals provided by decoder DEC and other sources within computer 100 are utilized by control logic CONL in generating gating control signals. These gating signals are transmitted via conductors of gating control cable GCC and control the specific logical operations of computer 100 required to execute the instruction.

Immediately prior to completing the execution of each instruction and as a part of the execution of that insruction, the next instruction word of the appropriate program sequence is read from memory MEM by means of a memory read command from computer 100. The address of this next instruction usually is obtained from register AR. As indicated above, the instruction presently being executed by computer 100 was obtained from a memory location defined by address information in register AR. In the course of executing that instruction, the address information in register AR is incremented by incrementing circuit INCA so that the resulting address information defines the memory location of the next instruction to be executed in the program sequence then in control of computer 100.

The above brief description of the general operation and organization of computer 100 and memory MEM is believed sufficient background for an understanding of the desicription of the operation of my invention which follows.

Main program sequence

Figure 2:
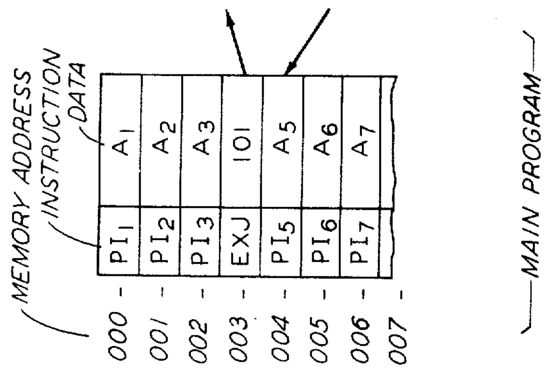
FIG. 2 diagrammatically illustrates the organization of a small portion of the main program as stored in memory.

FIG. 2 is a diagram showing the organization of one portion of the main program for computer 100 as it is stored in memory MEM. FIG. 2 shows seven memory locations of memory MEM which are respectively defined by addresses 000–007. Each memory location 000–007 contains an instruction word which includes an instruction portion comprising a code identifying an instruction to be executed by computer 100 and a data portion comprising address information. For example, address 000 contains an instruction code defining a program instruction $PI_1$ in the instruction portion thereof and address information $A_1$ in the data portion thereof.

In the following description it will first be assumed that computer 100 is presently executing instruction $PI_1$ which was fetched from address 000. As noted earlier herein, address 000 was stored in register AR when the instruction $PI_1$ presently being executed was fetched from memory MEM. In the course of executing instruction $PI_1$, control logic CONL energizes conductor INAR of gating control cable GCC. As a result, the address 000 in register AR is incremented by incrementing circuit INCA. The resulting address 001 in register AR defines the memory location from which the next instruction word will be fetched.

When signals from decoder DEC, sequencer SEQ, clock CLK and other sources in computer 100 indicate the near completion of execution of instruction $PI_1$, control logic CONL energizes conductors ARM and READ of cable GCC. As a result, the address 001 is gated from register AR through AND gates 16 to memory MEM and a read indication is provided memory MEM by the signal on conductor READ. Control logic CONL then energizes conductor MGDI of cable GCC to permit the instruction word read from memory address 001 to be transmitted through AND gates 14. At the same time, control logic CONL energizes conductors MEMIR and MEMBR of cable GCC, and the instruction word fetched from address 001 is gated through AND gates 1 and AND gates 2 to registers IR and BR.

The instruction portions I of both registers IR and BR now contain an instruction code defining program instruction $PI_2$. The data portions D of registers IR and BR now contain information defining an address $A_2$. The instruction code in register IR is decoded by decoder DEC and define by means of an input signal to control logic CONL. Control logic CONL proceeds to generate the gating control signals for implementing execution of instruction $PI_2$ in accordance with input information from sequencer SEQ, clock CLK, decoder DEC and other sources in computer 100. During execution of instruction $PI_2$, the address information 001 in register AR is again incremented in response to a signal on conductor INAR of cable GCC. The resulting address 002 in register AR defines the next memory location in memory MEM from which an instruction word will be fetched. The above described sequence of operations continues as computer 100 is advanced through and executes the program instructions $PI_1$–$PI_3$ in the sequence of the main program.

Jump transfer operation

It will now be assumed that the instruction word stored in the memory location defined by address 003 has been fetched from memory MEM following execution of program instruction $PI_3$. Therefore, instruction register IR now contains a code defining jump instruction EXJ in the instruction portion I thereof and address information defining address 101 in the data portion D thereof. Data register BR contains identical instruction and address information.

Figure 3B:
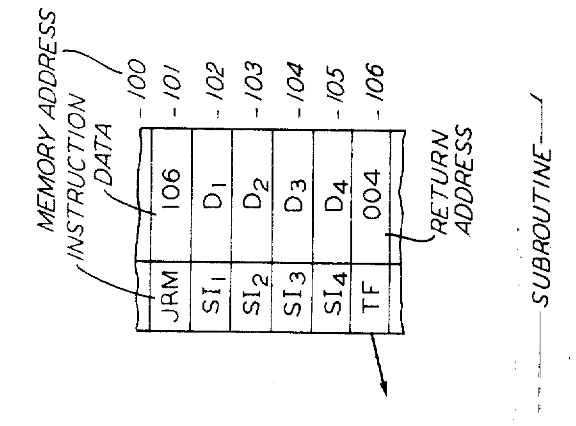
FIG. 3B diagrammatically illustrates the organization of the same subroutine shown in FIG. 3A after execution of the first instruction thereof.
Figure 3A:
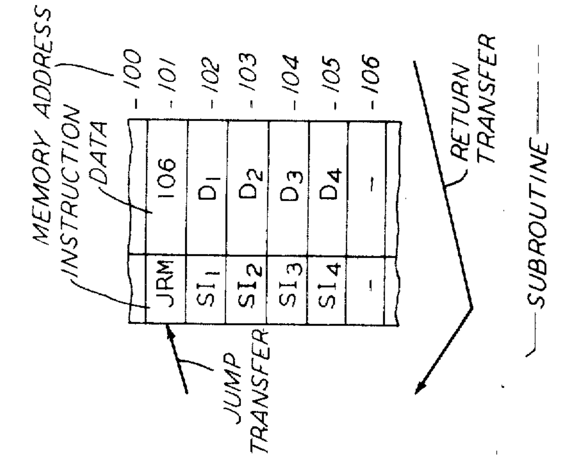
FIG. 3A diagrammatically shows the organization of an illustrative program subroutine as stored in memory prior to execution of the first instruction thereof.

Instruction EXJ is a jump instruction which will initiate a jump transfer to a subroutine. The subroutine comprises a sequence of instruction words beginning at the memory location defined by the address in the data portion of the instruction word. In the instance being described, that address is 101. FIG. 3A represents a subroutine comprising six subroutine instruction JRM, $SI_1$–$SI_4$ and a blank which are stored in memory locations defined by addresses 101–106.

The information in the instruction portion I of register IR is decoded by decoder DEC and identified to control logic CONL by a signal from decoder DEC on conductor EXJ. Control logic CONL, in response to the input signal on conductor EXJ and input signals from sequencer SEQ and clock CLK, causes the address information 003 present in register AR to be incremented by incrementing circuit INCA as described above. The resulting address 004 in register AR defines the next sequential memory location in the main program illustrated in FIG. 2. Control logic CONL then energizes conductor ARJR of cable GCC. As a result, the address 004 in register AR is transmitted through AND gate 8 into the data portion D of the register JR. Also in response to the signal on conductor ARJR, AND gates 6 are enabled. Transfer instruction code generator TFIC is permanently wired to supply coded signals which specify a transfer instruction TF. When AND gates 6 are enabled as described above, the transfer instruction code is gated from code generator TFIC into the instruction portion I of register JR.

Control logic CONL then energizes conductor BRAR of cable GCC. The signal on conductor BRAR causes the address 101 to be grated from the data portion D of register BR through AND gates 4 to register AR. Control logic CONL then enables conductors ARM and READ of cable GCC. As a result, the address information 101 stored in register AR is gated through AND gates 16 to memory MEM in association with a signal on conductor READ. Conductor MGDI is then energized by control logic CONL and the instruction word read from memory address 101 is transmitted through gates 14 to computer 100. At the same time, conductors MEMIR and MEMBR are energized by control logic CONL and the instruction word received through AND gates 14 is gated into registers IR and BR through AND gates 1 and 2.

The instruction word fetched from the first address 101 in the subroutine shown in FIG. 3A includes coding defining a JRM instruction in the instruction portion thereof and address information 106 in the data portion thereof. Execution of a JRM instruction will cause the entire contents of register JR to be stored in memory MEM at the memory location defined by the address information in the data portion of the instruction word. In the case being described, the instruction word includes address information 106. As indicated in FIG. 3A, address 106 is the last instruction word in the subroutine. No instruction word is presently stored at memory address 106.

In response to the presence of coding defining a JRM instruction in the instruction portion I of registed IR, decoder DEC provides a signal to control logic CONL on conductor JRM. In response to the signal from decoder DEC on conductor JRM and to signals form clock CLK, sequence SEQ and other sources, control logic CONL energizes conductors BRM and WRITE of cable GCC. As a result, the address information 106 stored in the data portion D of register is transmitted through AND gates 15 to memory MEM in association with a signal on conductor WRITE.

Control logic CONL then energizes conductor JRUB of cable GCC causing the content of register JR to be gated through AND gates 13 to unmask bus UB. At the same time, control logic CONL energizes the appropriate conductor of cable LCS through cable GCC to permit the information on unmasked bus UB to be passed unchanged through logic LOG to masked bus MB. Also, at the same time, control logic CONL energizes conductor MBM of cable GCC. As a result, the contents of register JR is gated through AND gates 13 to unmask bus UB, through logic circuit LOG to masked bus MB and through AND gates 17 to memory MEM. It will be recalled that registed JR contains an instruction code defining a transfer instruction TF in the instruction portion I thereof and return address information 004 defining the address of the next instruction of the main program in the data portion D thereof. This information is writen into memory MEM at the memory location defined by the address 106 previously transmitted from the data portion D of registed BR to memory MEM. As indicated in FIG. 3B, the last instruction word of the subroutine to which tranfser has been made now contains an instruction code defining a transfer instruction TF and address information 004 which defines the location of the next instruction of the main program to be executed following completion of the subroutine.

During execution of the instruction JRM, the address information 101, previously placed in register AR during execution of the preceding EXJ instruction, is incremented. Control logic CONL places a signal on conductor INAR of cable GCC which causes incrementing circuit INCA to increment the content of register AR. The resulting address 102 in register AR defines the memory location from which the next instruction of the subroutine will be fetched.

Upon completion of the above actions, control logic CONL energizes conductors ARM and READ of cable GCC. As a result, address 102 is transmitted from register AR to memory MEM in association with a read signal. The instruction word read from memory address 102 is transmitted from memory MEM to registers IR and BR as described earlier herein in response to signals on conductors MGDI, MEMIR and MEMBR of cable GCC. As a result, instruction register IR now contains an instruction code defining subroutine instruction $SI_2$ and the data D2 associated therewith.

In the course of executing the instruction $SI_2$, the content of register AR again is incremented as described above. The resulting address information 103 in register AR delnes the memory location of the next subroutine instruction word $SI_3$ of the subroutine sequence. The subroutine instruction words $SI_3$ and $SI_4$ are then fetched in sequence from memory MEM and executed by computer 100.

As a result of the above described generation of an instruction word defining a transfer instruction TF and a return address 004 and its insertion in addresss 106 of memory MEM, register JR is available for other use in execution of any of the subroutine instructions $SI_1$–$SI_4$.

Return transfer

During completion of the penultimate subroutine instruction $SI_4$, register AR contains address 106 as a result of incrementing the address 105 defining the memory location from which the instruction $SI_4$ was fetched. The last instruction word of the subroutine which was previously placed in the memory location defined by address 106 is now fetched. As described above, the content of register AR is gated to memory MEM in association with a read signal and the instruction word read from memory at address 106 is gated to registers IR and BR. The data portion D of register BR now contains the return address 004 and the instruction portion I of register IR now contains a code defining a transfer instruction TF. The instruction code is decoded by decoder DEC and conveyed to control logic CONL by a signal on conductor TF. In response to this signal, signals from clock CLK and sequencer SEQ and other input signals, control logic CONL energizes conductor BRAR of cable GCC which causes the address 004 to be gated from the data portion D of register BR through AND gates 4 to register AR.

Control logic CONL then energizes conductors ARM and READ of cable GCC. This causes the return address 004 to be transmitted from register AR to memory MEM in association with a read signal as described above. The main program instruction word located at address 004 of memory MEM is then transmitted as described above to registers IR and BR as a result of signals from control logic CONL on conductors MGDI, MEMIR and MEMBR. The resulting instruction word in registers IR and BR contains a code defining program instruction $PI_5$ and address information $A_5$. This instruction $PI_5$ is then executed by computer 100 and, upon its completion, the next main program instructions $PI_6$ and $PI_7$ are fetched and executed in sequence.

The above brief description of the sequence of actions taken by computer 100 to derive a return transfer instruction including the proper instruction code and return address and its insertion as a single entity into memory as the last instruction of a subroutine illustrates the principles of my invention. Advantageously, due to the insertion of the prewired transfer code TF into the instruction portion I of register JR at the same time that the return addresss information was gated into the data portion D of register JR, a complete instruction word can be placed into the last memory location of a subroutine without resorting to additional memory cycles or additional logical manipulation of instruction codes and address information.

The particular actions described above as taken by the illustrative computer 100 purposely were made as simple as possible to facilitate a clear understanding of the invention. It is to be understood that the above described arrangements are illustrative of the application of the principles of my invention. Numerous other arrangements may be devised by those skilled in the art without departing from the spirit and scope of the invention.

What is claimed is:

1. A program controlled data processing arrangement comprising memory means for storing in discrete memory cells thereof coded program words arranged in program word sequences, each program word comprising an instruction portion and a data portion;

a processor controlled in accordance with said program word sequences and comprising means for fetching said program words selectively from said memory cells and for writing words selectively into said memory cells in accordance with address information discretely defining said memory cells, first register means for storing first address information defining the memory cell in which the next program word of the particular program word sequence in control of said processor is stored, second register means for storing said data and instruction portions of a program word, and logic means responsive to an indication that control of said processor be transferred from said particular program word sequence to the first program word of another program sequence for transferring said first address information from said first register means to said data portion of said second register means and for inserting a predetermined instruction code in said instruction portion of said second register means, said predetermined code specifying that control of said processor be transferred to the program word in the memory cell defined by said data portion of said program word stored in said second register means; and said first program word of said other program word sequence specifying that said program word stored in said second register means be written into the memory cell in which is stored the last program word of said other program word sequence.

2. A program controlled data processing arrangement in accordance with claim 1 wherein said program word sequences include a main program sequence and a subroutine sequence, and said particular program word sequence comprises said main program sequence and said other program word sequence comprises said subroutine sequence.

3. A program controlled data processing arrangement in accordance with claim 1 wherein said program word sequences include a main program sequence and a plurality of subroutine sequences, and said particular and said other program word sequences comprise different ones of said subroutine sequences.

4. A program controlled data processing arrangement comprising memory means for storing in discrete memory cells thereof coded program words arranged in program word sequences, each program word comprising an instruction portion and a data portion;

a processor controlled in accordance with said program word sequences and comprising means for fetching said program words selectively from said memory cells and for writing words selectively into said memory cells in accordance with address information discretely defining said memory cells, first register means for storing first address information defining the memory cell in which the next program word of the particular program word sequence in control of said processor is stored, second register means for storing the data and instruction portions of a program word, means responsive to an indication that control of said processor be transferred from said particular program word sequence to the first program word of another program word sequence for transferring said first address information from said first register means to the data portion of said second register means, and logic means responsive to said indication for inserting a predetermined instruction code in the instruction portion of said second register means, said predetermined code specifying that control of said processor be transferred to the program word in the memory cell defined by said data portion of said program word stored in said second register means; and said first program word of said other program word sequence specifying that said program word stored in said second register means be written into the memory cell in which is stored the last program word of said other program word sequence.

5. A program controlled data processing arrangement comprising memory means for storing program words arranged in program word sequences, each program word comprising an instruction portion and a data portion; and a processor controlled in accordance with said program word sequences and including a jump register having an instruction portion and a data portion, a prewired transfer instruction code generator, means for simultaneously applying the transfer instruction code from said code generator to the instruction portion of said jump register and a return address to said data portion of said jump register, and means for transferring the contents of said jump register to said memory means.

References Cited

UNITED STATES PATENTS

| | | | |
|---|---|---|---|
| 3,018,956 | 1/1962 | Hosier et al. | 340—172.5 |
| 3,059,222 | 10/1962 | Demmer | 340—172.5 |
| 3,226,691 | 12/1965 | Hazard | 340—172.5 |
| 3,245,044 | 4/1966 | Meade et al. | 340—172.5 |
| 3,292,155 | 12/1966 | Neilson | 340—172.5 |

JOHN P. VANDENBURG, Primary Examiner